(12) United States Patent
Hinoki et al.

(10) Patent No.: US 7,935,380 B2
(45) Date of Patent: May 3, 2011

(54) METHOD OF PRODUCING ELECTRODE FOR CAPACITOR

(75) Inventors: Kiyonori Hinoki, Tokyo (JP); Kazuo Katai, Tokyo (JP); Yousuke Miyaki, Tokyo (JP); Hideki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 707 days.

(21) Appl. No.: 11/016,855

(22) Filed: Dec. 21, 2004

(65) Prior Publication Data

US 2005/0208207 A1 Sep. 22, 2005

(30) Foreign Application Priority Data

Dec. 26, 2003 (JP) ................................. 2003-433407

(51) Int. Cl.
*B05D 5/12* (2006.01)

(52) U.S. Cl. ........................................................ 427/79

(58) Field of Classification Search ...................... 427/79
See application file for complete search history.

(56) References Cited

U.S. PATENT DOCUMENTS

| | | | | |
|---|---|---|---|---|
| 5,569,560 | A * | 10/1996 | Olsen et al. ................... | 429/310 |
| 5,616,366 | A | 4/1997 | Olsen et al. | |
| 6,072,692 | A * | 6/2000 | Hiratsuka et al. ............. | 361/502 |
| 6,280,878 | B1 * | 8/2001 | Maruyama et al. ........... | 429/233 |
| 6,280,879 | B1 * | 8/2001 | Andersen et al. ............. | 429/233 |
| 6,573,004 | B1 * | 6/2003 | Igarashi et al. ............... | 429/217 |
| 6,865,068 | B1 * | 3/2005 | Murakami et al. ............ | 361/502 |
| 6,871,585 | B2 * | 3/2005 | Sato et al. ..................... | 100/41 |
| 2001/0012588 | A1 | 8/2001 | Kaido et al. | |
| 2001/0044045 | A1 | 11/2001 | Sato et al. | |
| 2003/0077513 | A1 * | 4/2003 | Ghantous et al. ............. | 429/219 |
| 2003/0086238 | A1 * | 5/2003 | Bendale et al. ............... | 361/502 |
| 2003/0124422 | A1 * | 7/2003 | Cintra et al. .................. | 429/209 |
| 2003/0231004 | A1 * | 12/2003 | Takahashi et al. ............ | 320/117 |
| 2004/0128813 | A1 * | 7/2004 | Murakami et al. ........... | 29/25.03 |

FOREIGN PATENT DOCUMENTS

| | | |
|---|---|---|
| JP | 11-288852 | 10/1999 |
| JP | 2000-150320 | 5/2000 |
| JP | 2000-208373 | 7/2000 |
| JP | 2001-284184 | 10/2001 |
| JP | 2001-307716 | 11/2001 |
| JP | 2002-50546 | 2/2002 |
| JP | 2002-75805 | 3/2002 |
| JP | 2003-297696 | 10/2003 |
| JP | 2003-297701 | 10/2003 |

OTHER PUBLICATIONS

U.S. Appl. No. 11/016,985, filed Dec. 21, 2004, Hinoki, et al.
U.S. Appl. No. 11/016,809, filed Dec. 21, 2004, Hinoki, et al.

* cited by examiner

*Primary Examiner* — Timothy H Meeks
*Assistant Examiner* — Tabassom T. Tadayyon-Eslami
(74) *Attorney, Agent, or Firm* — Oblon, Spivak, McClelland, Maier & Neustadt, L.L.P.

(57) ABSTRACT

The present invention provides a method of producing an electrode for an electric double layer capacitor, which yields the electrode with an electrode layer having a higher density by calendering treatment. A method of producing an electrode for a capacitor, which comprises at least a current collector and an electrode layer on the current collector, the method comprising the steps of: applying an electrode layer coating material which comprises at least a carbon material, a binder and a solvent, onto the current collector to form an electrode coating layer; drying the electrode coating layer on the current collector to set the amount of the solvent remaining in the electrode coating layer within a range of 5 to 35% by weight of the layer; and subjecting the electrode coating layer after the drying to calendering treatment to yield an electrode layer.

15 Claims, No Drawings

METHOD OF PRODUCING ELECTRODE FOR CAPACITOR

BACKGROUND OF THE INVENTION

1. Field of the Invention

The present invention relates to a method of producing an electrode for an electric double layer capacitor.

2. Disclosure of the Related Art

Electrochemical capacitors, a typical example of which is an electric double layer capacitor, are expected, for example, as backups for power sources of portable devices (small-sized electric devices) and others, auxiliary power sources for electric automobiles or hybrid automobiles, and the like. Various investigations for improving the performance of the capacitors have been made.

As portable devices and others have been becoming smaller and lighter in recent years, it has been particularly required to make an electric double layer capacitor smaller and lighter while the capacitor keeps sufficient performances required for devices on which the capacitor is to be mounted. In other words, an improvement in energy density per unit mass of an electric double layer capacitor, and an improvement in energy density per unit volume thereof have been required. Consequently, electrodes used in the electric double layer capacitor have been required to be made smaller and lighter.

As the electrodes, which are used in electric double layer capacitors, there are known electrodes fabricated by making fibrous activated carbon in a felt form and then vapor-depositing or bonding a current collector made of aluminum or the like to one side of the felt-form activated carbon, electrodes fabricated by kneading granular activated carbon together with a binder such as tetrafluoroethylene or the like, forming the kneaded material into a sheet form, and vapor-depositing or bonding a current collector to one side of the sheet, and other electrodes.

However, in the above-described conventional electrodes, which are fabricated by vapor-depositing or bonding a current collector to activated carbon formed in a felt or sheet form, physical adhesiveness between the activated carbon and the current collector is insufficient, and a decrease in the internal resistance is also insufficient. Additionally, there is a limit to an improvement in electrode characteristics. It is therefore difficult to make the electrodes smaller and lighter while the electrode characteristics are sufficiently maintained.

There is also suggested, for example, a tabular electrode fabricated by forming a kneaded product composed of a binder and a porous material such as activated carbon into a sheet form so as to yield a polarizable electrode (electrode layer), and then bonding the resultant electrode to a current collector through an intermediate layer composed of carbon black and a binder. In the electrode, the adhesiveness between the electrode layer and the current collector is improved and the contact resistance therebetween is decreased (see, for example, Japanese Laid-Open Patent Publication No. 2000-208373, Japanese Laid-Open Patent Publication No. 2001-284184, Japanese Laid-Open Patent Publication No. 2002-75805, and Japanese Laid-Open Patent Publication No. 2002-50546).

However, in each of the above-mentioned publications, an electrode layer is beforehand formed in a sheet form, and this sheet-form electrode layer is bonded to a current collector through an intermediate layer to fabricate an electrode. It is therefore necessary that the electrode layer has a thickness satisfying a mechanical strength for maintaining the shape of the sheet. Thus, it is difficult to make the thickness of the electrode layer smaller.

SUMMARY OF THE INVENTION

Thus, the present inventors have eagerly repeated research in order to make an electrode layer thinner and make an electrode smaller and lighter. As a result, the present inventors have found out that an electrode having a thinned electrode layer and having an excellent adhesive property between the electrode layer and a current collector can be obtained by a production method which comprises the steps of forming an undercoat layer comprising electrically conductive particles and a binder on a current collector by coating, and then forming an electrode layer comprising a carbon material and a binder on the undercoat layer by coating.

In the production, the electrode layer is dried and subsequently subjected to calendering treatment, thereby making the density of the electrode layer high.

An object of the present invention is to provide a method of producing an electrode for an electric double layer capacitor, which yields the electrode with an electrode layer having a higher density by calendering treatment.

The present inventors have made further research to find out that an electrode layer having a higher density can be obtained by setting the content of a solvent in an electrode coating layer into a specified range when the calendering treatment starts.

The present invention encompasses the following inventions.

(1) A method of producing an electrode for a capacitor, which comprises at least a current collector and an electrode layer on the current collector, the method comprising the steps of:

applying an electrode layer coating material which comprises at least a carbon material, a binder and a solvent, onto the current collector to form an electrode coating layer;

drying the electrode coating layer on the current collector to set the amount of the solvent remaining in the whole of the layer formed on the current collector within a range of 5 to 35% by weight of the layer; and subjecting the electrode coating layer after the drying to calendering treatment to yield an electrode layer.

(2) A method of producing an electrode for a capacitor, which comprises a current collector, an undercoat layer on the current collector, and an electrode layer on the undercoat layer, the method comprising the steps of:

applying an undercoat layer coating material which comprises at least electrically conductive particles, a binder and a solvent onto the current collector, and then drying the applied material to form an undercoat layer;

applying an electrode layer coating material which comprises at least a carbon material, a binder and a solvent onto the undercoat layer to form an electrode coating layer;

drying the electrode coating layer to set the amount of the solvent remaining in the whole of the layers formed on the current collector within a range of 5 to 35% by weight of the layers; and subjecting the electrode coating layer after the drying to calendering treatment to yield an electrode layer.

(3) The method of producing an electrode for a capacitor according to the above (1) or (2), wherein the drying of the electrode coating layer is performed at a temperature of 70 to 200° C. for 0.1 to 120 minutes.

(4) The method of producing an electrode for a capacitor according to any one of the above (1) to (3), wherein the calendering treatment is conducted at a pressure of 4,900 to 24,500 N/cm (0.5 to 2.5 t/cm).

According to the production method of the present invention, the solvent content in the coating layer(s) (that is, the electrode coating layer and, if any, the undercoat layer), which is/are formed on the current collector at the time of the start of the calendering treatment, is set within a range of 5 to 35% by weight, thereby yielding a more highly-packed electrode layer, that is, an electrode layer having a higher density. Therefore, the electrode layer can be made thinner, so as to realize a decrease in the size and the weight of an electrode. Accordingly, a capacitor having a higher capacity per unit volume can be fabricated using the electrode produced by the present invention.

DETAILED DESCRIPTION OF THE INVENTION

The electrode for an electric double layer capacitor fabricated in the present invention is composed mainly of a current collector, an undercoat layer on the current collector, and an electrode layer on the undercoat layer. A lead, which is used as an electrode connecting terminal, is usually formed at an end of the current collector.

The current collector is not specifically limited and may be any good conductor capable of transferring charges sufficiently through the undercoat layer into the electrode layer, and is permitted to be a current collector used in known electrodes for capacitor. The current collector is, for example, a metal foil made of Al or the like. Examples of the metal foil include an etched foil, a rolled foil, and others. The current collector is preferably an etched aluminum foil.

The thickness of the current collector is preferably from 20 to 50 µm, more preferably from 20 to 30 µm from the viewpoint of a decrease in the size and the weight of the electrode.

The undercoat layer is arranged between the current collector and the electrode layer, and causes the current collector and the electrode layer to adhere physically and electrically to each other. The undercoat layer comprises, as constituents thereof, at least electrically conductive particles and a binder capable of bonding/adhering to the electrically conductive particles. The undercoat layer is formed by applying an undercoat layer coating material which comprises the electrically conductive particles, the binder and a solvent on the current collector.

The electrically conductive particles are not limited to any especial kind if the particles have electron conductivity making it possible to advance the transfer of charges sufficiently between the current collector and the electrode layer. The particles may be, for example, particles made of a carbon material having electron conductivity. The carbon material may be carbon black or graphite from the viewpoint of the electron conductivity thereof. About the carbon material particles, the lattice plane spacing ($d_{002}$) thereof is preferably from 0.335 to 0.338 nm and the thickness of each of crystallites ($Lc_{002}$) thereof is preferably from 50 to 80 nm, which are determined by X-ray diffraction analysis, from the viewpoint of the electron conductivity.

Examples of the carbon black include acetylene black, Ketjen black, channel black, furnace black, thermal black, and others. Of these, acetylene black is preferable. The average particle diameter of the carbon black is preferably from 25 to 50 nm, and the BET specific surface area thereof is preferably 50 m$^2$/g or more, more preferably from 50 to 140 m$^2$/g. The use of such carbon black makes it possible to give excellent electron conductivity to the undercoat layer so as to decrease the internal resistance of the electrode.

Examples of the graphite include natural graphite, artificial graphite, expanded graphite, and others. Of these, artificial graphite is preferable. The average particle diameter of the graphite is preferably from 4 to 6 µm, and the BET specific surface area thereof is preferably 10 m$^2$/g or more, more preferably from 15 to 30 m$^2$/g. The use of such graphite makes it possible to give excellent electron conductivity to the undercoat layer so as to decrease the internal resistance of the electrode.

As the carbon material, only one out of the above-mentioned carbon blacks and graphites may be used, or two or more out of them may be used in combination.

The binder in the undercoat layer is not specifically limited and may be any binder capable of bonding/adhering to the electrically conductive particles. Examples thereof include polytetrafluoroethylene (PTFE), polyvinylidene fluoride (PVDF), polyethylene (PE), polypropylene (PP), and fluororubber. Of these, fluororubber is preferable.

Examples of the fluororubber include vinylidene fluoride-hexafluoropropylene (VDF-HFP) copolymer, vinylidene fluoride-hexafluoropropylene-tetrafluoroethylene (VDF-HFP-TFE) copolymer, vinylidene fluoride-pentafluoropropylene (VDF-PFP) copolymer, vinylidene fluoride-pentafluoropropylene-tetrafluoroethylene (VDF-PFP-TFE) copolymer, vinylidene fluoride-perfluoromethyl vinyl ether-tetrafluoroethylene (VDF-PFMVE-TFE) copolymer, vinylidene fluoride-chlorotrifluoroethylene (VDF-CTFE) copolymer, ethylene-tetrafluoroethylene copolymer, propylene-tetrafluoroethylene copolymer, and the like. Of these, fluororubbers wherein two selected from the group consisting of VDF, HFP and TFE are copolymerized are preferable, and VDF-HFP-TFE copolymer is particularly preferable in respect to improvement of the adhesive property between the current collector and the electrode layer and improvement of the chemical resistance.

As the binder(s), only one out of the above binders may be used, or two or more out of them may be used in combination.

The amount of the binder incorporated into the undercoat layer is varied by the specific surface area of the electrically conductive particles, the strength of the target electrode and others, and is preferably from 30 to 80% by weight, more preferably from 50 to 70% by weight of the dried undercoat coating layer (the electrically conductive particles+the binder). As the binder has a higher binding/adhering performance to the electrically conductive particles, the amount of the incorporated binder may be smaller in order to obtain a good adhesive property between the current collector and the electrode layer.

The solvent used in the coating material for undercoat layer is not specifically limited and may be any solvent wherein the binder can be dissolved, and an ordinary organic solvent may be used. Specific examples of the organic solvent include saturated hydrocarbons such as hexane; aromatic hydrocarbons such as toluene and xylene; alcohols such as methanol, ethanol, propanol, and butanol; ketones such as acetone, methyl ethyl ketone (MEK), methyl isobutyl ketone (MIBK), and diisobutyl ketone; esters such as ethyl acetate and butyl acetate; ethers such as tetrahydrofuran, dioxane, and diethyl ether; amides such as N,N-dimethylformamide, N-methylpyrrolidone, and N,N-dimethylacetamide; and halogenated hydrocarbons such as ethylene chloride, and chlorobenzene. Of these, ketone type and amide type solvents are preferable since the fluororubber can be dissolved therein. These solvents may be used alone or in a mixture of two or more thereof.

The amount of the solvent in the coating material for undercoat layer is preferably from about 600 to 2,000 parts by weight for 100 parts by weight of the total of the electrically conductive particles and the binder. The amount of the solvent is appropriately decided, considering the applicability of the coating material, and other factors.

In the preparation of the coating material for undercoat layer, the electrically conductive particles, the binder and the solvent are first mixed or kneaded in a usual manner to yield a slurry. The mixing or kneading can be performed by use of, for example, a roll mill, a planetary mixer, an open kneader, a continuous kneader, or a pressure kneader.

Next, the resultant slurry is preferably subjected to dispersing treatment. By dispersing treatment, a uniformly dispersed coating material for undercoat layer can be obtained. It is preferred to use a dispersing medium at the time of the dispersing treatment, and it is preferred to use ceramic beads as the dispersing medium. Examples of the ceramic beads include zirconia ($ZrO_2$) beads, alumina ($Al_2O_3$) beads, titania ($TiO_2$) beads, and the like. The use of the zirconia beads, which have a high specific gravity, is preferable from the viewpoint of an improvement in dispersion efficiency. The particle diameter of the ceramic beads is preferably from about 0.1 to 1.0 mm, more preferably from 0.1 to 0.8 mm in order to improve the dispersion property. As the particle diameter of the beads is smaller, more fine (more satisfactory) dispersion can be conducted. However, if the particle diameter of the beads is too small, the mass of each of the beads gets too small so that the collision energy thereof is reduced. Thus, the dispersion property tends to deteriorate. If the particle diameter of the beads is smaller than 0.1 mm, the effect of improving the dispersion property is not obtained very much, and moreover, if the beads are worn away by the use in a dispersing machine for a long time so that the particle diameter becomes small, it is feared that the beads held in the machine leak out from the screen, mesh, gaps or the like of the machine so as to be mixed with the coating material. On the other hand, if the particle diameter of the beads is larger than 1.0 mm, it is necessary to conduct dispersion for a long time. Thus, the workability is liable to deteriorate.

When glass beads are used for the dispersing treatment, the beads are worn away so that sodium ions therefrom are incorporated into the coating material. When steel beads are used, the beads are worn away so that the metal is incorporated into the coating material. The incorporation is not preferred because the effect of self-discharge (short-circuit) is produced. For this reason, the ceramic beads are used in the present invention.

It is advisable to use, as the dispersing machine, for example, a sand grinder mill, a pin mill, an attritor, or a ball mill. The retention time of the slurry in the dispersing machine is preferably from about 0.1 to 60 minutes, more preferably from 1 to 5 minutes. If the retention time is less than 0.1 minute, the dispersing treatment gets insufficient so that a sufficient adhesive property of the undercoat layer is not easily obtained. On the other hand, sufficient dispersing treatment can be conducted for a retention time of 60 minutes; therefore, a retention time exceeding 60 minutes is unnecessary. Herein, the retention time is defined by the following equation.

Retention time=(Empty volume [L] of vessel of dispersing machine/Volume [L] of slurry)×Dispersing time The filling ratio of the beads is preferably set into a range of 60 to 85% by weight. The bead filling ratio is defined by the following equation.

Bead filling ratio (% by weight)=[Bead mass [g]]/ (Empty volume [L] of vessel of dispersing machine×Bead density [g/L]×0.6)]×100

If the bead filling ratio is less than 60% by weight, the dispersing treatment tends to get insufficient so as to decrease the dispersing efficiency. If the bead filling ratio exceeds 85% by weight, the beads are excessively filled into the dispersing machine so that rotary parts of the machine are not easily rotated. Consequently, loads are liable to be applied to the parts so as to generate heat easily.

Such dispersing treatment of the slurry with the ceramic beads permits the preparation of a coating material for undercoat layer in a good dispersion state without agglomerate.

The prepared coating material for undercoat layer is applied onto a current collector, and then dried.

The application of the coating material for undercoat layer onto the current collector can be performed by an ordinary well-known coating method, examples of which include reverse roll method, direct roll method, blade method, knife method, extrusion nozzle method, curtain method, gravure roll method, bar coat method, dip method, kiss coat method, and squeeze method. A good surface state of the coating layer can be obtained by selecting the solvent composition of the coating material and drying conditions thereof in such a manner that the coating material is applied at a coating speed of 5 to 100 m/minute while the current collector is traveled.

The drying temperature is preferably from 50 to 150° C., more preferably from 70 to 140° C. If the drying temperature is less than 50° C., the solvent is insufficiently dried. If the drying temperature exceeds 150° C., the evaporation rate of the solvent gets too high so that the surface state of the undercoat layer may deteriorate. The thickness of the undercoat layer is preferably set into a range of about 0.2 to 10 μm from the viewpoint of a decrease in the size and the weight of the electrode and from the viewpoint of good electric conductivity between the current collector and the electrode layer.

The electrode layer is a layer which is formed on the undercoat layer and contributes to electric charge and discharge. This layer comprises, at constituents thereof, at least a carbon material having electric conductivity and a binder capable of bonding/adhering to the carbon material. An electrode layer coating material which comprises the carbon material, the binder and the solvent is applied onto the undercoat layer, thereby forming an electrode coating layer.

The carbon material is not specifically limited and may be any carbon material having electric conductivity. Examples thereof include granular or fibrous activated carbon, which is subjected to activating treatment. The average particle diameter of the carbon material is preferably from 3 to 20 μm, and the BET specific surface area thereof is preferably 1,500 $m^2/g$ or more, more preferably from 2,000 to 2,500 $m^2/g$. By the use of such a carbon material, the electrostatic capacity of the electrode can be made high.

The binder in the electrode layer is not specifically limited and may be any binder capable of bonding/adhering to the carbon material, and examples thereof include the same binders as exemplified as the binder in the undercoat layer. Fluororubber is preferable. Examples of the fluororubber include the same fluororubbers as exemplified as the binder in the undercoat layer. Of the fluororubbers, fluororubbers wherein two selected from the group consisting of VDF, HFP and TFE are copolymerized are preferable, and VDF-HFP-TFE copolymer is particularly preferable in respect to improvement of the adhesive property to the undercoat layer and improvement of the chemical resistance. The binders for the electrode layer may be used alone or in combination of two or more thereof. It is also preferable to use the same binder in the undercoat layer and the electrode layer since a better adhesive property between the undercoat layer and the electrode layer can be obtained.

The amount of the binder incorporated into the electrode layer is varied by the specific surface area of the carbon material, the strength of the target electrode and others, and is preferably from 5 to 20% by weight, more preferably from 8 to 15% by weight of the dried electrode coating layer (the carbon material+the binder+an optional electrically conductive auxiliary, which will be described below). As the binder has a higher binding/adhering performance to the carbon material, the amount of the incorporated binder may be smaller.

If necessary, an electrically conductive auxiliary is used in the electrode layer. The electrically conductive auxiliary is used to help the transfer of charges between the electrode layer and the current collector. The electrically conductive auxiliary is not specifically limited and may be any material having electron conductivity. Examples thereof include carbon materials such as carbon black and graphite, which have been described as the electrically conductive particles in the undercoat layer. As the electrically conductive auxiliary, acetylene black having the above-mentioned average particle diameter and BET specific surface area are preferable from the viewpoint of high electron conductivity. The amount of the electrically conductive auxiliary incorporated into the electrode layer is preferably from 0.5 to 2.0% by weight of the dried electrode coating layer.

The solvent used in the coating material for electrode layer is not specifically limited and may be any solvent wherein the binder can be dissolved, and an ordinary organic solvent may be used. Examples of the organic solvent include the same organic solvents as exemplified as the organic solvent in the coating material for undercoat layer. Ketone type and amide type solvents are preferable since the fluororubber can be dissolved therein. These solvents may be used alone or in a mixture of two or more thereof.

The amount of the solvent in the coating material for electrode layer is preferably set into a range of about 200 to 400 parts by weight for 100 parts by weight of the total of the carbon material, the binder and the optional electrically conductive auxiliary. The amount of the solvent is appropriately decided, considering the applicability of the coating material, and other factors.

In the preparation of the coating material for electrode layer, the carbon material, the binder and the solvent are first mixed or kneaded in a usual manner to yield a slurry. The mixing or kneading can be performed by use of, for example, a roll mill, a planetary mixer, an open kneader, a continuous kneader, or a pressure kneader.

Next, the resultant slurry is preferably subjected to dispersing treatment. By dispersing treatment, a uniformly dispersed coating material for electrode layer can be obtained. It is preferred to use a dispersing medium at the time of the dispersing treatment, and it is preferred to use, as the dispersing medium, ceramic beads for the same reasons as described about the preparation of the coating material for undercoat layer. Examples of the ceramic beads include zirconia ($ZrO_2$) beads, alumina ($Al_2O_3$) beads, titania ($TiO_2$) beads, and the like. The use of the zirconia beads, which have a high specific gravity, is preferable from the viewpoint of an improvement in dispersion efficiency. The particle diameter of the ceramic beads is preferably from about 0.3 to 1.5 mm, more preferably from about 0.3 to 0.8 mm. If the particle diameter of the beads is smaller than 0.3 mm, the effect of improving the dispersion property is not obtained very much. If the particle diameter of the beads is larger than 1.5 mm, it is necessary to conduct dispersion for a long time. Thus, the workability is liable to deteriorate.

It is advisable to use, as the dispersing machine, for example, a sand grinder mill, a pin mill, an attritor, or a ball mill. In the case that no dispersing medium is used, an ultrasonic dispersing machine or a collision (impact) dispersing machine such as a homogenizer may be used.

The retention time of the slurry in the dispersing machine is preferably from about 0.1 to 10 minutes, more preferably from 0.15 to 5 minutes. If the retention time is less than 0.1 minute, the dispersing treatment gets insufficient so that the strainer of the machine may be clogged. On the other hand, sufficient dispersing treatment can be conducted for a retention time of 10 minutes; therefore, a retention time exceeding 10 minutes is unnecessary. Herein, the retention time is defined by the above-mentioned equation.

The filling ratio of the beads, which is defined by the above-mentioned equation, is preferably set into a range of 60 to 85% by weight. If the bead filling ratio is less than 60% by weight, the dispersing treatment tends to get insufficient so as to decrease the dispersing efficiency. If the bead filling ratio exceeds 85% by weight, the beads are excessively filled into the dispersing machine so that rotary parts of the machine are not easily rotated. Consequently, loads are liable to be applied to the parts so as to generate heat easily.

Such dispersing treatment of the slurry with the ceramic beads permits the preparation of a coating material for electrode layer in a good dispersion state without agglomerate.

The prepared coating material for electrode layer is applied onto the undercoat layer, and then dried.

The application of the coating material for electrode layer onto the undercoat layer can be performed by an ordinary well-known coating method, examples of which include reverse roll method, direct roll method, blade method, knife method, extrusion nozzle method, curtain method, gravure roll method, bar coat method, dip method, kiss coat method, and squeeze method. A good surface state of the coating layer can be obtained by selecting the solvent composition of the coating material and drying conditions thereof in such a manner that the coating material is applied at a coating speed of 5 to 100 m/minute while the current collector is traveled.

The electrode coating layer is dried, thereby setting the amount of the solvent remaining in the whole of the layers formed on the current collector (that is, the electrode coating layer and the undercoat layer) within a range of 5 to 35% by weight, preferably 11 to 33% by weight of the total weight of the layers on the current collector. The remaining solvent amount is set within this specified range, and calendering treatment is conducted in the subsequent step, thereby yielding a more highly-packed electrode layer, which has a higher density (for example, 0.640 $g/cm^3$ or more). If the remaining solvent amount is less than 5% by weight at the time of the start of the calendering treatment, the solvent amount is too small so that the electrode layer is not easily highly packed. As a result, an electrode layer having a density of less than 0.640 $g/cm^3$ is unfavorably formed. On the other hand, if the remaining solvent amount exceeds 35% by weight at the time of the start of the calendering treatment, the solvent amount is too large so that the electrode layer is not easily highly packed. As a result, an electrode layer having a density of less than 0.640 $g/cm^3$ is unfavorably formed. The reason why the calendering treatment is started when the remaining solvent amount is within the specified range of 5 to 35% by weight, whereby the electrode layer is highly packed would be as follows.

When the solvent is present in an appropriate amount around the binder in the electrode coating layer at the time of the calendering treatment, the binder does not aggregate so that the fluidity of the binder is kept in the electrode coating layer. The pressure of the calendering treatment permits the binder to be transferred so as to be filled into gaps between grains of the carbon material. As a result, a highly-packed electrode layer can be obtained. If the solvent amount in the electrode coating layer is too small, the above-mentioned advantageous effect cannot be obtained. On the other hand, if the solvent amount is too large, the solvent is also present in a large amount in the gaps between the carbon material grains at the time of the calendering treatment. Thus, the binder cannot be transferred to be filled into the gaps between the carbon material grains. The following problem is also caused if the solvent amount is too large: the electrode coating layer adheres to guide rolls in a transporting path from the end of the drying of the electrode coating layer to the winding of the layer, or guide rolls in a transporting path from the winding rolls to the calendering treatment step, so that the rolls are stained. For these reasons, it is considered that the remaining solvent amount within the specific range of 5 to 35% by weight makes it possible to cause the electrode layer to be highly packed.

Since the undercoat layer is thinner than the electrode coating layer, the remaining solvent amount in the undercoat layer is a negligible amount. However, the remaining solvent in the undercoat layer is also transferred into the electrode coating layer; therefore, when the undercoat layer is present, the solvent amount remaining in the whole of the layers formed on the current collector (i.e., the undercoat layer and the electrode coating layer) is set within a range of 5 to 35% by weight. When one or more optional layers other than the undercoat layer are present, the solvent amount remaining in the whole of the layers including the optional layer(s) is set within the range of 5 to 35% by weight.

The temperature for drying the electrode coating layer is preferably from 70 to 200° C., more preferably from 90 to 180° C. If the temperature is less than 70° C., the solvent is insufficiently dried. If the temperature exceeds 200° C., the evaporation rate of the solvent gets too high so that the surface state of the electrode layer may deteriorate. The time for drying the electrode coating layer is preferably from 0.1 to 120 minutes, more preferably from 0.5 to 100 minutes. It is advisable to select the temperature and the time from these ranges so as to set the solvent amount remaining in the electrode coating layer after dried within the above-mentioned specified range.

After the electrode coating layer is dried, the layer is subjected to calendering treatment so as to yield an electrode layer. The calendering treatment is usually conducted by use of a roll press machine. The calendering pressure at this time is preferably set within a range of, for example, 4,900 to 24,500 N/cm (0.5 to 2.5 t/cm).

The thickness of the electrode layer is preferably set into a range of about 50 to 200 μm from the viewpoint of a decrease in the size and the weight of the electrode and from the viewpoint of obtaining a high electrostatic capacity.

EXAMPLES

The present invention will be more specifically described byway of the following examples. However, the present invention is not limited by the examples.

Example 1

(Preparation of Undercoat Layer Coating Material)

60 g of acetylene black (trade name: Denka Black, manufactured by Denki Kagaku Kogyo Kabushiki Kaisha, BET specific surface area: 67 m$^2$/g) and 40 g of a fluororubber (trade name: Viton-GF, manufactured by Du Pont) were introduced into 186 g of methyl isobutyl ketone (MIBK). The mixture was kneaded for 45 minutes by means of a planetary mixer. 964 g of MIBK was further added to the kneaded product, and then the resultant was stirred for 1 hour to yield a slurry. The resultant slurry was introduced into a sand grinder mill, and then was subjected to dispersing treatment for a retention time of 2 minutes using Zirconia beads (zirconia $ZrO_2$, manufactured by Nikkato Corp., particle diameter: 0.3 mm) as a dispersing medium. At this time, the peripheral velocity of the dispersing machine was set to 10 m/sec, the flow rate was set to 138 g/min (160 mL/min), and the bead filling ratio was set to 80% by weight. In this way, an under coat layer coating material was prepared. The undercoat layer coating material was kept in a good dispersion state without the generation of any agglomerate.

(Preparation of Electrode Layer Coating Material)

90 g of granular activated carbon (trade name: RP-20, manufactured by Kuraray Chemical Co., Ltd., aspect ratio: about 1.0) and 1 g of acetylene black (trade name: Denka Black, manufactured by Denki Kagaku Kogyo Kabushiki Kaisha, BET specific surface area: 67 m$^2$/g) were mixed for 15 minutes by means of a planetary mixer. 9 g of a fluororubber (trade name: Viton-GF, manufactured by Du Pont), 57 g of MIBK, and 81 g of propylene carbonate were introduced into the whole of the mixture. The mixture was kneaded for 45 minutes by means of a planetary mixer. Furthermore, 132 g of MIBK was added to the kneaded product, and then the resultant was stirred for 1 hour to yield a slurry. The resultant slurry was introduced into a sand grinder mill, and then was subjected to dispersing treatment for a retention time of 10 seconds using Zirconia beads (zirconia $ZrO_2$, manufactured by Nikkato Corp., particle diameter: 0.8 mm) as a dispersing medium. At this time, the peripheral velocity of the dispersing machine was set to 10 m/sec, the flow rate was set to 124 g/min (120 mL/min), and the bead filling ratio was set to 80% by weight. In this way, an electrode layer coating material was prepared. The electrode layer coating material was kept in a good dispersion state without the generation of any agglomerate.

(Fabrication of Electrode)

The above-mentioned undercoat layer coating material was uniformly applied onto one surface of an aluminum foil (thickness: 30 μm) as a current collector by gravure roll method, and then dried in a drying furnace at a temperature of 100° C. to form an undercoat layer of 5 μm in thickness.

Thereafter, the undercoat layer coating material was uniformly applied onto the other surface of the aluminum foil by gravure roll method, and then dried in the drying furnace at a temperature of 100° C. to form an another undercoat layer of 5 μm in thickness. The remaining solvent amount in both of the undercoat layers was 0.1% by weight or less.

Next, the above-mentioned electrode layer coating material was uniformly applied onto the undercoat layer formed on the one surface of the aluminum foil by gravure roll method, so as to form an electrode coating layer. Subsequently, the resultant was caused to pass through the drying furnace at a temperature of 180° C. in 96 minutes. In this way, the solvent remaining in the formed layers was further removed to form the electrode coating layer of 170 μm in thickness.

Thereafter, the electrode layer coating material was uniformly applied onto the undercoat layer formed on the other surface of the aluminum foil by gravure roll method, so as to form an another electrode coating layer. Subsequently, the resultant was caused to pass through the drying furnace at a temperature of 180° C. in 96 minutes, thereby removing MIBK and propylene carbonate to form the electrode coating layer of 170 μm in thickness. At this time, the solvent amount remaining in the whole of the layers formed on the two surfaces of the current collector (i.e., the two undercoat layers and the two electrode coating layers) was 5% by weight.

The resultant raw electrode (electrode sheet) was subjected to calendering treatment at a pressure of 9,800 N/cm (1 t/cm) with a roll press machine having a pair of metallic press rolls each having a diameter of 350 mm. In this way, an electrode layer of about 120 μm in thickness was formed on each of two surfaces of the current collector, so as to yield an electrode.

The resultant electrode was cut into a rectangle (30 mm×56 mm), and further dried in a vacuum at a temperature of 180° C. for 60 hours to remove water content and the solvent adsorbed on the electrode layer. In this way, an electrode for electric double layer capacitor was fabricated.

(Measurement of Remaining Solvent Amount)

The remaining solvent amount in the whole of the layers on the two surfaces of the current collector before the calendering treatment was obtained by measuring the weight of the raw electrode sample and the weight thereof after the sample was completely dried, and then calculating an equation described below. The complete drying was performed by drying in a vacuum at a temperature of 180° C. for 60 hours. The weight measurement was made in a dry room (dew point: −70° C.) to prevent the coating layers from adsorbing water content. The results are shown in Table 1.

Remaining solvent amount (% by weight)=[1−(Aw)/(Bw)]×100, wherein

Bw=(Weight of whole of layers before complete drying)=(Weight of raw electrode before complete drying)−(Weight of current collector), and Aw=(Weight of whole of layers after complete drying)=(Weight of raw electrode after complete drying)−(Weight of current collector).

Further, the remaining solvent amount in the undercoat layer after the layer was applied and dried was also measured in the same way.

(Measurement of Electrode Density)

About the resultant electrode (30 mm×56 mm), the thickness and the weight of its electrode layer were measured. The weight of the activated carbon in the electrode layer was calculated from the measured electrode layer weight, and the weight ratio between the activated carbon, acetylene black and fluororubber used in the electrode layer coating material. The activated carbon weight per $cm^3$ of the electrode layer was defined as the electrode density. In order to measure the weight of the electrode layer, the weight of only the undercoat layers was beforehand measured. The results are shown in Table 1.

(Determination of Stain on Guide Roll)

It was observed with the naked eye whether or not stains were generated on guide rolls in the transporting path from the end of the drying of the electrode coating layer to the winding thereof, or guide rolls in the transporting path to the calendering treatment step. The results are shown in Table 1.

Examples 2 to 7, and Comparative Example 1

Each electrode for electric double layer capacitor was fabricated in the same way as in Example 1 except that conditions for drying its electrode coating layers were changed as shown in Table 1 so as to change the remaining solvent amount in the whole of its layers (i.e., its two undercoat layers and its electrode coating layers) after dried as shown in Table 1. About the resultant each electrode, the electrode density thereof was measured, and stains on the guide rolls were also determined. The results are shown in Table 1.

TABLE 1

| | Electrode coating layer Drying conditions | Remaining solvent amount after drying (% by weight) | Electrode density ($g/cm^3$) | Stain on guide roll |
|---|---|---|---|---|
| Comparative Example 1 | 85° C., 3 min. | 37 | 0.638 | Generated |
| Example 1 | 180° C., 96 min. | 5 | 0.640 | Not generated |
| Example 2 | 165° C., 48 min. | 11 | 0.644 | Not generated |
| Example 3 | 150° C., 24 min. | 17 | 0.649 | Not generated |
| Example 4 | 135° C., 12 min. | 23 | 0.646 | Not generated |
| Example 5 | 120° C., 6 min. | 29 | 0.644 | Not generated |
| Example 6 | 105° C., 4 min. | 33 | 0.643 | Not generated |
| Example 7 | 95° C., 3 min. | 35 | 0.640 | Not generated |

According to Table 1, the electrodes obtained in Examples 1 to 7 of the present invention were high and excellent in electrode density. On the other hand, the electrode obtained in Comparative Example 1 was poor in electrode density. The remaining solvent amount in the whole of the layers after dried was as high as 37% by weight, and stains were generated on the guide rolls in the transporting path from the end of the drying of the electrode coating layers to the winding of the layers.

What is claimed is:

1. A method of producing an electrode for a capacitor, which comprises a current collector, an undercoat layer on the current collector, and an electrode layer on the undercoat layer, the method comprising:
    applying an undercoat layer coating material, which comprises at least electrically conductive particles, a binder and a solvent, onto the current collector, and then drying the applied material to set the amount of the solvent remaining in the applied material within a range of 0.1% by weight or less, thereby forming an undercoat layer;
    applying an electrode layer coating material, which comprises at least a carbon material, a binder and a solvent, onto the undercoat layer to form an electrode coating layer;
    drying the electrode coating layer to set the amount of the solvent remaining in the whole of the layers formed on the current collector within a range of 11 to 35% by weight of the layers; and
    subjecting the electrode coating layer after the drying to calendering treatment to yield an electrode layer,
    wherein the binder in the undercoat layer coating material and the binder in the electrode layer coating material are the same, and
    wherein the drying of the electrode coating layer is performed at a temperature of 90° C. to 180° C. for 0.1 to 100 minutes.

2. The method of producing an electrode for a capacitor according to claim 1, wherein the calendering treatment is conducted at a pressure of 4,900 to 24,500 N/cm (0.5 to 2.5 t/cm).

3. The method of producing an electrode for a capacitor according to claim 1, wherein the electrode layer has a thickness of 50 to 200 μm.

4. The method of producing an electrode for a capacitor according to claim 1, wherein the undercoat has a thickness of 0.2 to 10 μm.

5. The method of producing an electrode for a capacitor according to claim 1, wherein the undercoat electrically conductive particles are carbon black particles, and an average particle diameter of the carbon black particles is from 25 to 50 nm, and the BET specific surface area is 50 m²/g or greater.

6. The method of producing an electrode for a capacitor according to claim 1, wherein the undercoat electrically conductive particles are graphite particles, and the average particle diameter of the graphite particles is from 4 to 6 μm, and the BET specific surface area is 10 m²/g or greater.

7. The method of producing an electrode for a capacitor according to claim 1, wherein the binder in the undercoat layer is at least one binder selected from the group consisting of polytetrafluoroethylene (PTFE), polyvinylidene fluoride (PVDF), polyethylene (PE), polypropylene (PP), and fluororubber.

8. The method of producing an electrode for a capacitor according to claim 1, wherein an amount of the binder in the undercoat layer is from 50 to 70 wt. % of the dried undercoat layer.

9. The method of producing an electrode for a capacitor according to claim 1, wherein the solvent of the undercoat layer is at least one organic solvent selected from the group consisting of saturated hydrocarbons; aromatic hydrocarbons; alcohols; ketones; esters; ethers; amides; and halogenated hydrocarbons.

10. The method of producing an electrode for a capacitor according to claim 1, wherein an average particle diameter of the carbon material in the electrode layer is from 3 to 20 μm, and the BET specific surface area is 1,500 m²/g or greater.

11. The method of producing an electrode for a capacitor according to claim 1, wherein an amount of the binder in the electrode layer is from 5 to 20 wt. % of the dried electrode layer.

12. The method of producing an electrode for a capacitor according to claim 1, wherein an electrode layer density is 0.640 g/cm³ or greater.

13. The method of producing an electrode for a capacitor according to claim 1, wherein the undercoat layer is dried at 50-150° C. before applying the electrode layer.

14. The method of producing an electrode for a capacitor according to claim 1, wherein the drying of the electrode coating layer is performed for 0.5 to 100 minutes.

15. The method of producing an electrode for a capacitor according to claim 1, wherein the drying of the electrode coating layer is performed for 3 to 100 minutes.

* * * * *